US012650870B2

(12) United States Patent
Mohanty et al.

(10) Patent No.: US 12,650,870 B2
(45) Date of Patent: Jun. 9, 2026

(54) RESOURCE PREDICTION FOR MICROSERVICES

(71) Applicant: Dell Products L.P., Round Rock, TX (US)

(72) Inventors: Bijan Kumar Mohanty, Austin, TX (US); David J. Linsey, Marietta, GA (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 921 days.

(21) Appl. No.: 17/861,553

(22) Filed: Jul. 11, 2022

(65) Prior Publication Data

US 2024/0012667 A1     Jan. 11, 2024

(51) Int. Cl.
G06F 9/455 (2018.01)
G06F 9/50 (2006.01)

(52) U.S. Cl.
CPC ...... G06F 9/45558 (2013.01); G06F 9/45545 (2013.01); G06F 9/5077 (2013.01); G06F 2009/4557 (2013.01); G06F 2009/45583 (2013.01)

(58) Field of Classification Search
CPC ........... G06F 2099/5019; G06F 9/5005; G06F 9/5077; G06F 9/45558; G06F 9/5061; G06F 9/5027; G06F 2009/45583; G05F 9/5016
See application file for complete search history.

(56) References Cited

U.S. PATENT DOCUMENTS

| | | | |
|---|---|---|---|
| 2010/0325191 A1* | 12/2010 | Jung ...................... | G06F 15/16 |
| | | | 718/1 |
| 2011/0225299 A1* | 9/2011 | Nathuji ............... | G06F 9/45558 |
| | | | 718/1 |
| 2019/0190796 A1* | 6/2019 | Asthana ................ | G06F 9/5077 |
| 2020/0285503 A1* | 9/2020 | Dou ...................... | G06F 9/5072 |
| 2020/0311573 A1* | 10/2020 | Desai .................... | H04L 47/826 |
| 2021/0303985 A1* | 9/2021 | Lakshmikantha .. | G06F 11/3495 |
| 2021/0312277 A1* | 10/2021 | Prabhudesai ....... | G06F 11/2025 |
| 2021/0357255 A1* | 11/2021 | Mahadik .................. | G06F 9/50 |
| 2022/0276737 A1* | 9/2022 | Cunha ..................... | G06F 30/27 |
| 2022/0383144 A1* | 12/2022 | Ha .......................... | G06F 9/505 |
| 2022/0383324 A1* | 12/2022 | Sheshadri .............. | H04L 41/16 |

(Continued)

OTHER PUBLICATIONS

S. Muppala, X. Zhou, L. Zhang, G. Chen, Regression-based resource provisioning for session slowdown guarantee in multi-tier Internet servers, 2012 (Year: 2012).*

(Continued)

*Primary Examiner* — Aimee Li
*Assistant Examiner* — Ivan Alexander Castaneda
(74) *Attorney, Agent, or Firm* — Ryan, Mason & Lewis, LLP

(57) ABSTRACT

A method comprises receiving a request to predict an amount of at least one resource for at least one hosting instance of one or more microservices. Using one or more machine learning models, the amount of the at least one resource is predicted in response to the request. The at least one hosting instance is generated based, at least in part, on the predicted amount. In some embodiments, the at least one resource comprises, for example, a memory and/or a CPU, and the amount of the at least one resource comprises a size of the memory and/or a number of CPU core units.

20 Claims, 20 Drawing Sheets

(56) References Cited

U.S. PATENT DOCUMENTS

| | | | |
|---|---|---|---|
| 2023/0030795 A1* | 2/2023 | Govindarajan ....... | G06F 9/5011 |
| 2023/0110012 A1* | 4/2023 | Jasleen .............. | G06F 11/3433 |
| | | | 718/104 |
| 2023/0236871 A1* | 7/2023 | Marzorati .............. | G06F 30/27 |
| | | | 718/100 |

OTHER PUBLICATIONS

R. Moreno-Vozmediano, R. S. Montero, E. Huedo, I. M. Llorente, Efficient resource provisioning for elastic Cloud services based on machine learning techniques, 2019 (Year: 2019).*

K. Casey, "What's the Difference between a Pod, a Cluster, and a Container?" https://enterprisersproject.com/article/2020/9/pod-cluster-container-what-is-difference#:~:text=%E2%80%9CA%20container%20runs%20logically%20in,tight%20logical%20borders%20called%20namespaces.%E2%80%9D, Sep. 1, 2020, 6 pages.

The Kubernetes Authors, "Resource Management for Pods and Containers," https://kubernetes.io/docs/concepts/configuration/manage-resources-containers/, Apr. 30, 2022, 11 pages.

* cited by examiner

400

| DATE AND TIME | MICROSERVICE NAME | INSTANCE ID# | INSTANCE TYPE | COMPUTE SIZE (MILLI-CPU) | EPHEMERAL STORAGE SIZE (MiB) | AVG. CPU UTILIZATION (%) | AVG. MEMORY UTILIZATION (%) | AVG. NETWORK IO (KiB) | AVG. BLOCK IO (MiB) | TOTAL COMPUTE UTILIZED (MILLI-CPU) | TOTAL STORAGE UTILIZED (MiB) |
|---|---|---|---|---|---|---|---|---|---|---|---|
| 20210126 16:50:03 | get_customer | 101 | CONTAINER | 1000 | 512 | 27 | 62 | 1.63 | 0.36 | 270 | 317 |
| 20210126 16:50:03 | get_price | 107 | VM | 2000 | 1024 | 38 | 83 | 1.59 | 0.41 | 760 | 849 |
| 20210126 16:50:03 | update_product | 232 | CONTAINER | 1000 | 512 | 43 | 54 | 0.79 | 0.27 | 430 | 276 |
| 20210126 16:55:03 | get_customer | 101 | CONTAINER | 1000 | 512 | 62 | 65 | 0.53 | 0.19 | 620 | 332 |
| 20210126 16:55:03 | get_price | 107 | VM | 2000 | 1024 | 42 | 73 | 1.27 | 0.57 | 840 | 790 |
| 20210126 16:55:03 | update_product | 232 | CONTAINER | 1000 | 512 | 29 | 49 | 0.71 | 0.34 | 290 | 250 |

Figure 5:
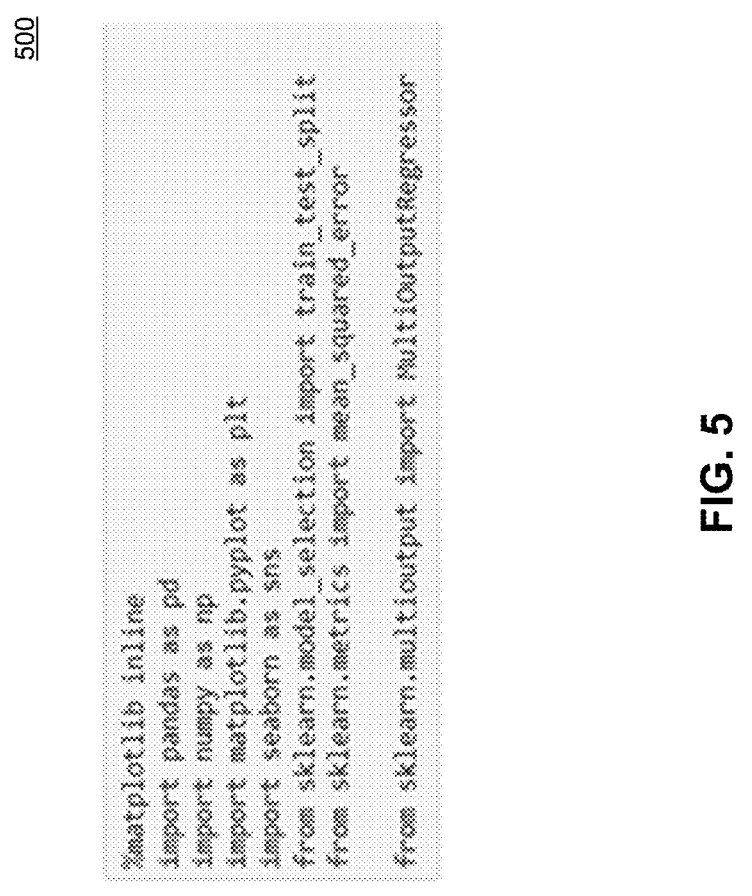

```
%matplotlib inline
import pandas as pd
import numpy as np
import matplotlib.pyplot as plt
import seaborn as sns
from sklearn.model_selection import train_test_split
from sklearn.metrics import mean_squared_error
from sklearn.multioutput import MultiOutputRegressor
```

```
date_extracted_df = pd.DataFrame()
date_extracted_df['year'] = pd.DatetimeIndex(original_df['date']).year
date_extracted_df['month'] = pd.DatetimeIndex(original_df['date']).month
date_extracted_df['week'] = pd.DatetimeIndex(original_df['date']).week
date_extracted_df['day'] = pd.DatetimeIndex(original_df['date']).day
date_extracted_df['day_name'] = pd.DatetimeIndex(original_df['date']).day_name()
date_extracted_df['hour'] = pd.DatetimeIndex(original_df['date']).hour
date_extracted_df['minute'] = pd.DatetimeIndex(original_df['date']).minute

#Remove date column from the original dataframe as date feature is extracted already
del original_df['date']
```

```
date_extracted_df.head()
```

| | year | month | week | day | day_name | hour | minute |
|---|---|---|---|---|---|---|---|
| 0 | 2021 | 1 | 4 | 26 | Tuesday | 16 | 50 |
| 1 | 2021 | 1 | 4 | 26 | Tuesday | 16 | 50 |
| 2 | 2021 | 1 | 4 | 26 | Tuesday | 16 | 50 |
| 3 | 2021 | 1 | 4 | 27 | Wednesday | 12 | 55 |
| 4 | 2021 | 1 | 4 | 27 | Wednesday | 12 | 55 |

801

```
host_resources_df = pd.concat([date_extracted_df, original_df], axis=1)
```

```
host_resources_df.head(5)
```

| | year | month | week | day | day_name | hour | minute | microservice_name | instance_id | instance_type | compute_size | memory_size | compute_utilized |
|---|---|---|---|---|---|---|---|---|---|---|---|---|---|
| 0 | 2021 | 1 | 4 | 26 | Tuesday | 10 | 50 | get_customer | 101 | container | 1000 | 512 | 270 |
| 1 | 2021 | 1 | 4 | 26 | Tuesday | 10 | 50 | get_price | 197 | VM | 2000 | 1024 | 780 |
| 2 | 2021 | 1 | 4 | 26 | Tuesday | 10 | 50 | update_product | 202 | Container | 1000 | 512 | 490 |
| 3 | 2021 | 1 | 4 | 27 | Wednesday | 13 | 55 | get_customer | 101 | container | 1000 | 512 | 620 |
| 4 | 2021 | 1 | 4 | 27 | Wednesday | 12 | 55 | get_price | 197 | VM | 2000 | 1024 | 940 |

```
# Encode the categorical values by using Label Encoding
from sklearn.preprocessing import LabelEncoder host_resources_df['day_name'] = LabelEncoder().fit_transform(host_resources_df['day_name'])
host_resources_df['microservice_name'] = LabelEncoder().fit_transform(host_resources_df['microservice_name'])
host_resources_df['instance_type'] = LabelEncoder().fit_transform(host_resources_df['instance_type'])

host_resources_df.head()
```

| | year | month | week | day | day_name | hour | minute | microservice_name | instance_id | instance_type | compute_size | memory_size | compute_utilized |
|---|---|---|---|---|---|---|---|---|---|---|---|---|---|
| 0 | 2021 | 1 | 4 | 26 | 4 | 16 | 50 | 0 | 101 | 2 | 1000 | 512 | 270 |
| 1 | 2021 | 1 | 4 | 26 | 4 | 16 | 50 | 1 | 107 | 1 | 2000 | 1024 | 780 |
| 2 | 2021 | 1 | 4 | 26 | 4 | 16 | 50 | 2 | 232 | 0 | 1000 | 512 | 430 |
| 3 | 2021 | 1 | 4 | 27 | 5 | 12 | 55 | 0 | 101 | 2 | 1000 | 512 | 620 |
| 4 | 2021 | 1 | 4 | 27 | 5 | 12 | 55 | 1 | 107 | 1 | 2000 | 1024 | 840 |

```
# Split Train and Test data sets
#first get the independent variables and dependent variable separated
features = [col for col in host_resources_df.columns if col is 'compute_utilized' and col is 'memory_utilized']

X_train, X_test, y_train, y_test = train_test_split(host_resources_df[features], host_resources_df[['compute_utilized',
                                                    test_size=.3, random_state=1)
```

```
#Linear Regression
from sklearn.linear_model import LinearRegression
model = LinearRegression()

# fit model
model.fit(X_train, y_train)
score = model.score(X_test, y_test)

print('Accuracy of Linear Regressor :', score * 100, ' %')

Accuracy of Linear Regressor : 80.04181356625205 %
```

```
# train model
from sklearn.neighbors import KNeighborsRegressor
model = KNeighborsRegressor()

# fit model
model.fit(x_train, y_train)
score = model.score(X_test, y_test)

print('Accuracy of KNN Regressor :',score * 100, ' %')

Accuracy of KNN Regressor : 89.96299842603091 %
```

```
#Gradient Boosting Regressor
from sklearn.ensemble import GradientBoostingRegressor gbr = GradientBoostingRegressor()

model = MultiOutputRegressor(estimator=gbr)

# fit model
model.fit(X_train, y_train)
score = model.score(X_test, y_test)

print('Accuracy of GradientBoosting Regressor :',score * 100, ' %')

Accuracy of GradientBoosting Regressor : 94.55230290762661 % row = [2022, 1, 4, 27, 5, 12, 55, 1, 107, 1, 2000, 1024]
yhat = model.predict([row])
print(yhat)

```
#Random Forest Regressor
from sklearn.ensemble import RandomForestRegressor model = RandomForestRegressor(max_depth = 100, n_estimators=100, random_state = 42)

model = RandomForestRegressor(estimators=100)

# fit model
model.fit(X_train, y_train)
score = model.score(X_test, y_test)

print('Accuracy of RandomForest Regressor :',score * 100, ' %')
```

```
Accuracy of RandomForest Regressor : 89.48022955520556  %
```

```
row = [2022, 1, 4, 27, 5, 12, 55, 1, 107, 1, 2000, 1024]
yhat = model.predict([row])
print(yhat)
```

```
#Support Vector Regressor
from sklearn.svm import LinearSVR svr = LinearSVR()

model = MultiOutputRegressor(estimator=svr)

# fit model
model.fit(X_train, y_train)
score = model.score(X_test, y_test)

print('Accuracy of SVR Regressor :',score * 100,' %')

Accuracy of SVR Regressor : 88.78453603037644  %
```

```
Using tensorflow.keras to create the Dense Neural Network model for multi-output regression import tensorflow.keras as keras
from tensorflow.keras.layers import Dense input_layer = keras.Input(shape=12, name="input_layer")

dense_1 = keras.layers.Dense(12, name = 'dense_1')(input_layer)
dense_2 = keras.layers.Dense(12, name = 'dense_2')(dense_1)

regression_output1 = keras.layers.Dense(1, activation = 'linear', name = 'regression_output1')(dense_2)
regression_output2 = keras.layers.Dense(1, activation = 'linear', name = 'regression_output2')(dense_2)

model = keras.Model(inputs=input_layer,outputs=(regression_output1, regression_output2))
```

```
model.compile(
    optimizer="adam",
    loss=[
        keras.losses.MeanSquaredError(),
        keras.losses.MeanSquaredError(),
    ]
)

model.fit(x_train,
    {"regression_outputs": y_train["compute_utilized"], "regression_output2": y_train["memory_utilized"]},
    epochs=200,
    batch_size=10,
    verbose=0)
```

```
row = [2022, 1, 4, 27, 5, 12, 55, 1, 167, 1, 2000, 1024]
predictions = model.predict([row])

print(predictions[0])
print(predictions[1])

Figure 19:
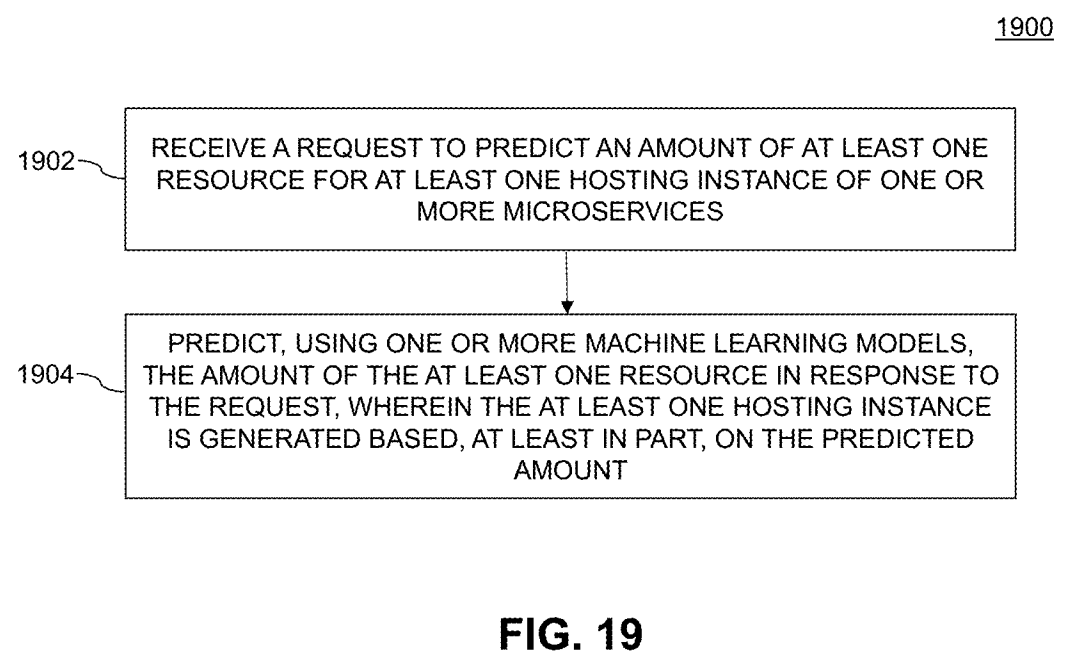

RECEIVE A REQUEST TO PREDICT AN AMOUNT OF AT LEAST ONE RESOURCE FOR AT LEAST ONE HOSTING INSTANCE OF ONE OR MORE MICROSERVICES

1902

PREDICT, USING ONE OR MORE MACHINE LEARNING MODELS, THE AMOUNT OF THE AT LEAST ONE RESOURCE IN RESPONSE TO THE REQUEST, WHEREIN THE AT LEAST ONE HOSTING INSTANCE IS GENERATED BASED, AT LEAST IN PART, ON THE PREDICTED AMOUNT

RESOURCE PREDICTION FOR MICROSERVICES

COPYRIGHT NOTICE

FIELD The field relates generally to information processing systems, and more particularly to management of microservices.

BACKGROUND

Enterprises with complex information technology (IT) systems rely on a multitude of software applications, which incorporate microservices to execute at least a portion of the application functions. Microservices comprise, for example, collections of loosely coupled, fine-grained and parallelized services implementing lightweight protocols. The microservices can be deployed in a hybrid cloud infrastructure, which allows for decoupling and reduces dependency, thus enabling each microservice to change and scale independently.

When demand on an underlying system that hosts microservices changes, the scale of a hosting microservices infrastructure may require modification. Under conventional approaches, when making scale adjustments, there are no systems in place which consider how particular microservices utilize an infrastructure.

SUMMARY

Embodiments provide a microservices resource prediction platform in an information processing system.

For example, in one embodiment, a method comprises receiving a request to predict an amount of at least one resource for at least one hosting instance of one or more microservices. Using one or more machine learning models, the amount of the at least one resource is predicted in response to the request. The at least one hosting instance is generated based, at least in part, on the predicted amount.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts example training data in an illustrative embodiment.

FIG. 5 depicts example pseudocode for importation of libraries in an illustrative embodiment.

FIG. 7A depicts example pseudocode for performing feature engineering on training data in an illustrative embodiment.

FIG. 7B depicts feature engineered training data in an illustrative embodiment.

FIG. 8A depicts example pseudocode for concatenating an original data frame and a data extracted data frame in an illustrative embodiment.

FIG. 8B depicts a combined data frame in an illustrative embodiment.

FIG. 9A depicts example pseudocode for encoding training data in an illustrative embodiment.

FIG. 9B depicts encoded training data in an illustrative embodiment.

FIG. 10 depicts example pseudocode for splitting a dataset into training and testing components and for creating separate datasets for independent and dependent variables in an illustrative embodiment.

FIG. 11 depicts example pseudocode for building, training and computing accuracy of a linear regression model in an illustrative embodiment.

FIG. 12 depicts example pseudocode for building, training and computing accuracy of a k-nearest neighbor (KNN) regression model in an illustrative embodiment.

FIG. 13 depicts example pseudocode for building, training and computing accuracy of a gradient booting regression model in an illustrative embodiment.

FIG. 14 depicts example pseudocode for building, training and computing accuracy of a random forest regression model in an illustrative embodiment.

FIG. 15 depicts example pseudocode for building, training and computing accuracy of a support vector machine (SVM) linear regression model in an illustrative embodiment.

FIG. 16 depicts example pseudocode for building a neural network in an illustrative embodiment.

FIG. 17 depicts example pseudocode for compiling and training the neural network in an illustrative embodiment.

FIG. 18 depicts example pseudocode for predicting target values using the neural network in an illustrative embodiment.

FIG. 19 depicts a process for microservice resource amount prediction according to an illustrative embodiment.

DETAILED DESCRIPTION

Figure 1:
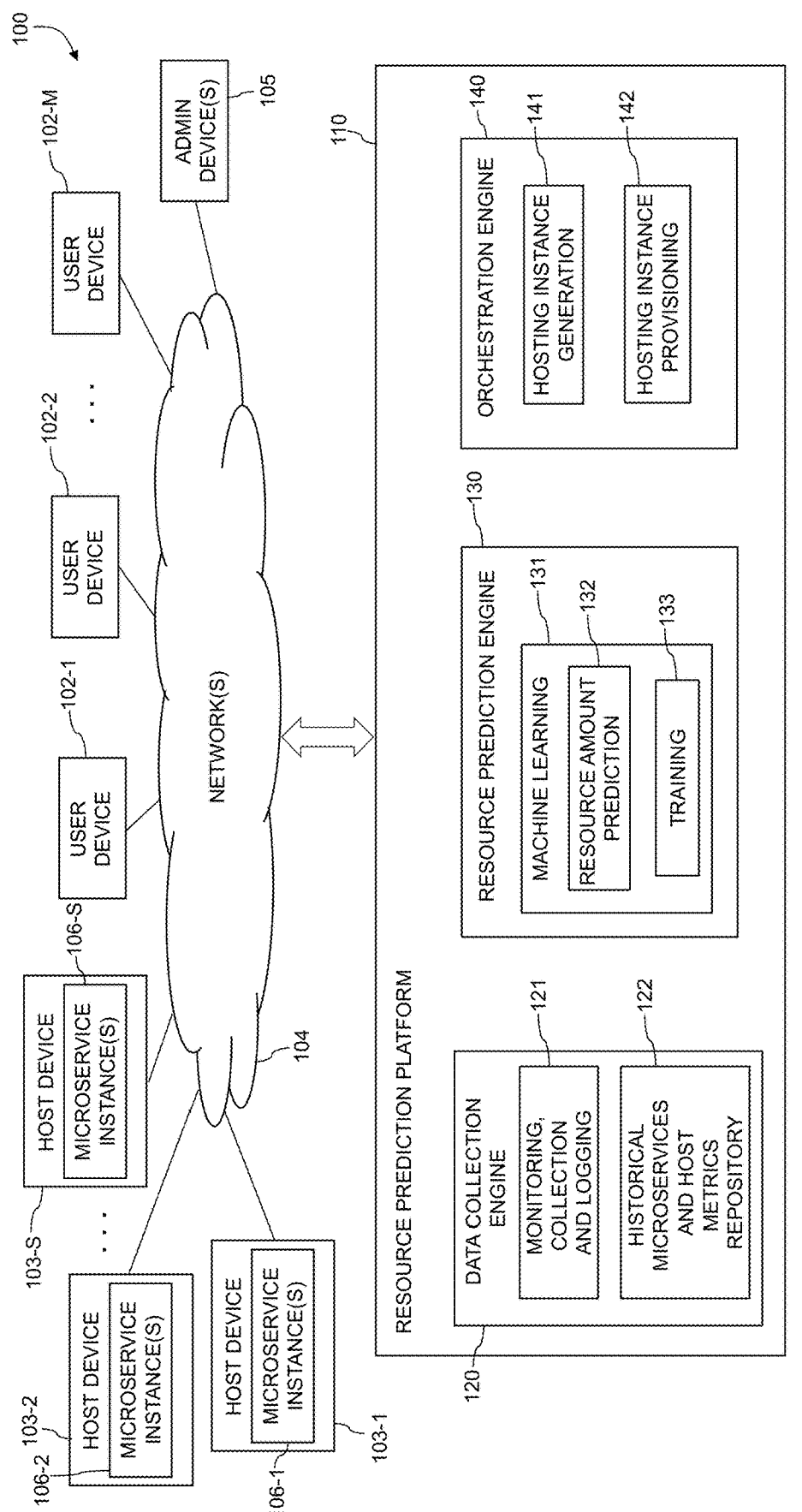
FIG. 1 depicts an information processing system with a resource prediction platform in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown.

Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "microservice" or "microservices" refers to collections of loosely coupled, fine-grained and parallelized services implementing lightweight protocols. Microservices can refer to a suite of small services for an application, with each microservice executing its own process and communicating with lightweight mechanisms that use relatively small amounts of computer resources.

As used herein, "application programming interface (API)" or "interface" refers to a set of subroutine definitions, protocols, and/or tools for building software. Generally, an API defines communication between software components. APIs permit programmers to write software applications consistent with an operating environment or website. APIs are used to integrate and pass data between applications, and may be implemented on top of other systems.

FIG. 1 shows an information processing system 100 configured in accordance with an illustrative embodiment. The information processing system 100 comprises user devices 102-1, 102-2, . . . 102-M (collectively "user devices 102"), host devices 103-1, 103-2, . . . 103-S (collectively "host devices 103"), and one or more administrator devices ("Admin device(s)") 105. The user devices 102, host devices 103 and administrator devices 105 communicate over a network 104 with a resource prediction platform 110. The variable M and other similar index variables herein such as K, L and S are assumed to be arbitrary positive integers greater than or equal to one.

The user devices 102, host devices 103 and administrator devices 105 can comprise, for example, Internet of Things (IoT) devices, desktop, laptop or tablet computers, mobile telephones, or other types of processing devices capable of communicating with the resource prediction platform 110 over the network 104. Such devices are examples of what are more generally referred to herein as "processing devices." Some of these processing devices are also generally referred to herein as "computers." The user devices 102, host devices 103 and administrator devices 105 may also or alternately comprise virtualized computing resources, such as virtual machines (VMs), containers, etc. The user devices 102, host devices 103 and/or administrator devices 105 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. Resource prediction services may be provided for users utilizing one or more machine learning models, although it is to be appreciated that other types of infrastructure arrangements could be used. At least a portion of the available services and functionalities provided by the resource prediction platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the resource prediction platform 110, as well as to support communication between the resource prediction platform 110 and connected devices (e.g., user devices 102, host devices 103 and administrator devices 105) and/or other related systems and devices not explicitly shown.

In some embodiments, the administrator devices 105 are assumed to be associated with repair technicians, system administrators, information technology (IT) managers, software developers, release management personnel or other authorized personnel configured to access and utilize the resource prediction platform 110.

As explained in more detail herein, the host devices 103 comprise respective microservice instance(s) 106-1, 106-2, . . . 106-S (collectively "microservice instances 106"). A host device 103 may comprise one or more microservice instances 106 configured to execute designated services of an application. For example, a plurality of microservice instances 106 respectively corresponding to different microservices may collectively correspond to the services of a single application, with each microservice instance corresponding to an independently deployable service of the application. In illustrative embodiments, each function of the application is executed by an autonomous, independently-running microservice. As explained in more detail herein, a microservice may run in a container (e.g., Docker, Linux container (LXC) or other type of container), virtual machine (VM) and/or pod on a host device (e.g., host device 103). As used herein, a "pod" refers to a group of one or more containers. The containers in a pod may share storage network resources and a specification for how to run the containers.

Different instances of the same microservice may run in different containers on the same host device or on different host devices 103. The host devices 103 may be, for example, cloud servers. Respective microservices may correspond to respective application functions such as, but not necessarily limited to, searching, messaging, payments, support, accounting, payroll, etc. The microservices are loosely integrated into an application using API gateways. Container orchestration tools such as, for example, Kubernetes®, can be utilized to manage the allocation of system resources for each microservice.

System behavior (e.g., transactional system behavior) is not always constant, and instead varies depending, for example, on the day of the week and time of year. A variety of factors can impact the performance and latency of microservices and their underlying implementing systems. For example, microservice performance can be impacted by the volume of transactions, number of users, amount of database load, other prescheduled jobs running at the same time, etc. These factors may vary over the course of, for example, a day, week or month. Other factors that can affect microservice performance include, but are not necessarily limited to, increased seasonal load (e.g., Black Friday and other holiday sales), extract, transform and load (ETL) processing, batch jobs running at certain times, and an underperforming database. Resource issues such as, for example, high central processing unit (CPU) utilization, high memory utilization, high volumes of input/output (IO) operations and thread locking can directly impact a container or other configuration hosting a microservice, which may increase the response time of the microservice or cause the microservice to time out. Resource issues may also cause the microservice to return errors. Network issues in the containers and other host systems providing a runtime infrastructure can also impact microservices.

Microservices may be deployed in a container-based environment for fault tolerance and resiliency and may be managed by container orchestration tools such as, for example, Kubernetes®, Docker Swarm®, AmazonEKS® (Elastic Kubernetes Service), AmazonECS® (Elastic Container Service), and PKS® (Pivotal Container Service). These orchestration tools may support dynamic automatic scaling (also referred to herein as "elastic auto-scaling") of a container cluster to automatically scale a microservices infrastructure in an effort to meet demand and/or handle container or other host system failures. Similarly, automatic scaling of VMs can be supported in cloud environments such as, for example, Amazon® Web Services (AWS®), Azure® and VMWare Tanzu®.

In illustrative embodiments, automated scaling may be performed to dynamically add or remove instances of containers, pods and/or VMs to or from a cluster to meet the demands (e.g., loads) of microservices. Rules may be implemented to trigger addition or removal of a hosting instance based on a resource utilization state. In a non-limiting operational example, an auto-scaling rule can provision a new hosting instance to a cluster if CPU and/or memory utilization exceeds a designated threshold (e.g., 70%), and can deactivate a hosting instance when CPU and/or memory utilization drops below a designated threshold (e.g., 30%). Additionally or alternatively, an auto-scaling rule may specify adding a new hosting instance in response to failure of an existing hosting instance. The embodiments may support scale-out (horizontal scaling) and scale-up (vertical scaling).

Conventional approaches to configuring new instances of containers, pods and/or VMs leverage configuration files for allocating resource size limits. Existing approaches rely on configuration files (e.g., JavaScript Object Notation (JSON) or YAML Ain't Markup Language (YAML) configuration files) with static resource amounts that are universally applied to different microservices. For example, the configuration files specify pre-configured minimum and maximum limits for the sizes of compute, ephemeral storage, and other resources. The current approaches are problematic in that they provide a "one-size-fits-all" approach, which fails to consider actual resource utilization of a microservice. For example, not all microservices are built in the same manner and the behavior and resource utilization of each microservice vary depending on how a microservice is structured. Using static and universal resource sizes to provision new microservice hosting instances fails to consider the differences between microservices and unnecessarily wastes computing resources.

Advantageously, illustrative embodiments provide techniques for using machine learning to predict resource sizing for a hosting instance of given microservice based on historical resource utilization by the same microservice as the given microservice and/or by similar microservices to the given microservice. By leveraging historical resource utilization data of containers, pods and/or VMs hosting the same or similar microservices, and training a multi-target regression machine learning algorithm with the historical resource utilization data, illustrative embodiments provide techniques to predict resource sizes (e.g., compute, ephemeral storage, and other resource sizes) of new microservice hosting instances. The predicted resource sizes are input to an orchestrator (e.g., container and/or VM orchestration tool) provisioning the new hosting instance, which, instead of using the static and hardcoded resource values from a configuration file, uses the predicted resource sizes to configure and generate the hosting instance. Advantageously, by using one or more machine learning models to predict new hosting instance resource sizes and applying those predicted values to provision new microservice hosting instances, the embodiments provide an intelligent framework for elastic auto-scaling of a cloud-native, microservices infrastructure that optimizes resource utilization.

The resource prediction platform 110 in the present embodiment is assumed to be accessible to the user devices 102, host devices 103 and/or administrator devices 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the resource prediction platform 110 includes a data collection engine 120, a resource prediction engine 130 and an orchestration engine 140. The data collection engine 120 includes a monitoring, collection and logging layer 121 and a historical microservices and host metrics repository 122. The resource prediction engine 130 includes a machine learning layer 131 comprising resource amount prediction and training layers 132 and 133. The orchestration engine 140 includes a hosting instance generation layer 141 and a hosting instance provisioning layer 142.

The monitoring, collection and logging layer 121 of the data collection engine 120 collects parameters corresponding to processing by the microservice instances 106 of microservice operations (also referred to herein as "microservice transactions"). The parameters may be collected from the host devices 103 and/or from applications used for monitoring microservice and host component metrics, such as, for example, Kubernetes®, Docker Swarm®, Amazon EKS®, AmazonECS®, PKS® and other container orchestration or monitoring tools. The parameters comprise, for example, microservice identifiers (e.g., microservice names), microservice operation request times and/or dates, microservice operation response time, microservice operation input/output (IO) parameters (e.g., throughput, IO operations per second (IOPS), latency, average network IO, average block IO), user information and/or error information. Other parameters can include, for example, identifiers (e.g., container, pod and/or VM IDs), CPU utilization, memory utilization, storage utilization, compute size (e.g., number of CPU cores (millicores)), and ephemeral storage size of host components (e.g., host devices, containers, pods, VMs, etc.) hosting a microservice. As used herein, "microservice operations" are to be broadly construed and refer to, for example, microservice transactions initiated by, for example, an invocation, request or call to a microservice. The microservice operations include, but are not necessarily limited to, read operations, write operations and/or subroutines used to, for example, perform application functions. The monitoring, collection and logging layer 121 collects historical parameters corresponding to processing by the microservice instances 106 of past microservice operations. The collected data comprises past microservice operation data and host component resource utilization data corresponding to microservice operations which have been completed. The historical parameters may be collected from the host devices 103 and/or from applications used for monitoring microservice and host component metrics, such as, for example, the container orchestration or monitoring tools mentioned herein above, which log microservice, host component and application activity. The historical parameters relating to microservice operations are stored in the historical microservices and host metrics repository 122 and input to the resource prediction engine 130 to be used as training data by the training layer 133. The historical parameters relating to microservice operations are used to train the machine learning models used by the resource amount prediction layer 132 to learn which resource amounts correspond to operation of the respective microservice instances 106.

The monitoring, collection and logging layer 121 also collects current or real-time microservice operation data and host component resource utilization data corresponding to microservice operations which are in progress or have been recently completed (e.g., within microseconds or milliseconds). The current or real-time microservice operation data and host component resource utilization data is similar to the collected historical microservice operation data and host component resource utilization data. The current or real-time microservice operation data and host component resource utilization data is used by the orchestration engine 140 to assess whether there is a need for a new microservice hosting instance on one or more of the host devices 103. For example, in illustrative embodiments, microservices run on a cluster of hosting instances (e.g., container, pod, VM) for high availability and fault tolerance. In a cloud-native application environment, auto-scaling is enabled to automatically scale-up or scale-down the cluster depending upon the load. The orchestration engine 140, more particularly, the hosting instance provisioning layer 142, analyzes the current or real-time microservice operation data and host component resource utilization data to determine whether there is a need to add a new hosting instance(s) of a specific microservice(s). For example, rules may be implemented by the hosting instance provisioning layer 142 to trigger addition or removal of a hosting instance based on a resource utilization state. In a non-limiting operational example, an auto-scaling rule can provision a new hosting instance to a cluster if CPU and/or memory utilization exceeds a designated threshold, and can deactivate a hosting instance when CPU and/or memory utilization drops below a designated threshold. The hosting instance provisioning layer 142 may support scale-out (horizontal scaling) and scale-up (vertical scaling).

The resource prediction engine 130, more particularly, the training layer 133 of the machine learning layer 131 uses the historical parameters collected by the monitoring, collection and logging layer 121 to train one or more machine learning algorithms used by the resource amount prediction layer 132 to predict resource sizes of a microservice hosting instance that is to be added. In accordance with one or more embodiments, when auto-scaling is needed to add a new hosting instance of a given microservice, the orchestration engine 140 invokes a request to the resource amount prediction layer 132 to predict amounts of resources of a hosting instance for that microservice from the historical metrics data. The predicted resource sizing information is used by the orchestration engine 140, more particularly, the hosting instance generation layer 141, to create the hosting instance with the corresponding resource allocations.

To predict microservice instance resource sizing, the resource amount prediction layer 132 leverages historical utilization data (e.g., metrics such as CPU, memory and storage utilization) associated with each microservice instance 106 in its corresponding hosting environment as captured by the monitoring, collection and logging layer 121. The utilization data and associated timestamps capture, for example, load, volume and seasonality, which are used by the machine learning model to predict future utilization of resources in a hosting instance for a given microservice. In illustrative embodiments, the resource amount prediction layer 132 uses a multi-target regression algorithm to predict the size of each resource for a given microservice. The orchestration engine 140, which may comprise, but is not necessarily limited to, infrastructure orchestration tools like Kubernetes®, Docker Swarm®, AmazonEKS®, AmazonECS® and PKS®, applies the predicted resource sizes when provisioning new instances of containers, pods and/or VMs.

In illustrative embodiments, the resource amount prediction layer 132 uses the multi-target (also referred to herein as "multi-output") regression machine learning algorithm to predict the size of various resources of the hosting instance including, but not necessarily limited to, CPU utilization, storage utilization, memory utilization and others. Historical utilization metrics of the microservices and of their hosting infrastructures (e.g., host device 103, container, pod, VM) are received by the resource amount prediction layer 132 from the historical microservices and host metrics repository 122.

The multi-target regression machine learning algorithm uses one or more independent variables to predict multiple dependent variable outputs (e.g., CPU amounts, storage amounts and others). The outputs may be dependent on the input(s) and upon each other. For example, memory utilization may be dependent upon the CPU utilization and vice versa. The outputs are not necessarily independent of each other and may require a model that predicts outputs together or each output contingent upon other outputs.

Illustrative embodiments may use different approaches and algorithms to achieve multi-target regression. Some algorithms have built-in support for multiple outputs. In some embodiments, algorithms that do not have built-in support for multi-target regression use a wrapper to achieve multi-output support. The embodiments utilize, for example, linear regression, KNN regression and/or random forest regression algorithms, which natively support multi-target predictions. Some embodiments utilize, for example, support vector machine (SVM) regression or gradient boosting regression algorithms that do not natively support multi-target predictions. In this case, these algorithms are used in conjunction with a wrapper function (e.g., MultiOutputRegressor, available from a multi-output package of an ScikitLearn library). Instances of the unsupported algorithms are input to the wrapper function to create a model that is capable of predicting multiple output values.

As noted herein, historical microservices and host metrics are used for training the multi-target regression models. FIG. 4 depicts example training data in an illustrative embodiment. As can be seen in the table 400, the training data identifies a date and time of a microservice operation, the microservice name, an instance ID number, instance type, compute size (e.g., number of CPU cores (millicores)), ephemeral storage size of host components (e.g., host devices, containers, pods, VMs, etc.), average CPU utilization percentage, average memory (e.g., RAM) utilization percentage, average network IO operation size and average block IO operation size. The training data further includes two possible ones of the multiple outputs including, but not necessarily limited to, total utilized compute size and total utilized storage for a given microservice operation. The data shown in the table 400 is a non-limiting example of the attributes of training data, and the embodiments are not necessarily limited to the depicted attributes.

Figure 2:
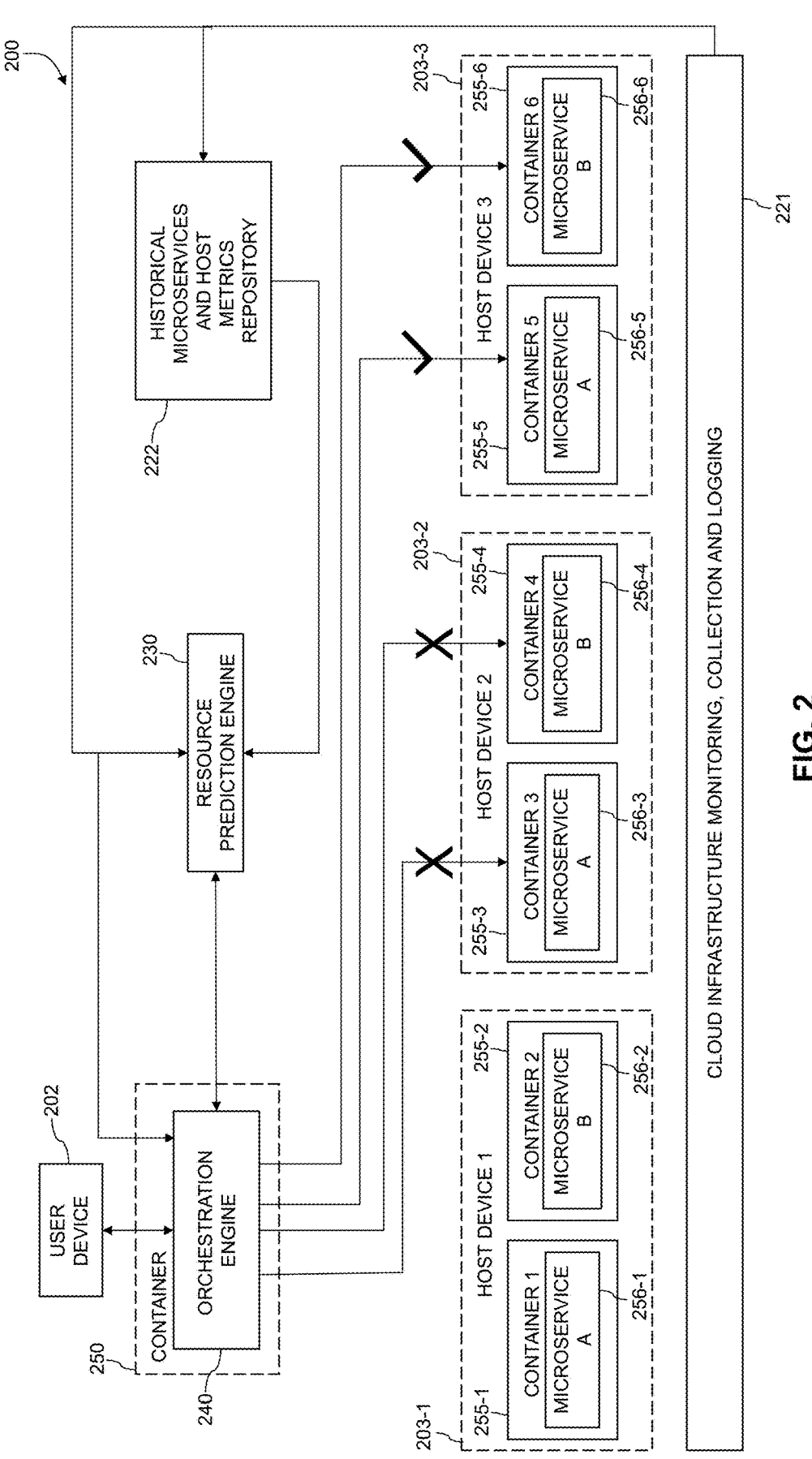
FIG. 2 depicts an operational flow for microservice resource amount prediction and microservice assignment in an illustrative embodiment.

Referring to the operational flow 200 in FIG. 2, the cloud infrastructure monitoring, collection and logging layer 221, which is the same as or similar to the monitoring, collection and logging layer 121, monitors, collects and logs past and current microservice operation and host component parameters as described hereinabove. The past microservice operation and host component parameter data is sent to the historical microservices and host metrics repository 222 (which is the same as or similar to the historical microservices and host metrics repository 122) and is provided to the resource prediction engine 230 as training data. The resource prediction engine 230 is the same as or similar to the resource prediction engine 130.

The cloud infrastructure monitoring, collection and logging layer 221 monitors, collects and logs past and current microservice operation and host component parameters from host device 1 203-1, host device 2 203-2 and host device 3 203-3 (collectively "host devices 203"), which can be the same as or similar to the host devices 103. Host device 1 203-1 comprises container 1 255-1 and container 2 255-2 respectively hosting instances of microservice A 256-1 and microservice B 256-2. Host device 2 203-2 comprises container 3 255-3 and container 4 255-4 respectively hosting additional instances of microservice A 256-3 and microservice B 256-4. Host device 3 203-2 comprises container 5 255-5 and container 6 255-6 respectively hosting further instances of microservice A 256-5 and microservice B 256-6. Although three host devices 203 each comprising two containers 255 and two microservice instances 256 are shown, the embodiments are not necessarily limited thereto. For example, there may be more or less than three host devices 203, and the number of containers 255 and microservice instances 256 in each host device 203 can vary. Microservices A and B are different microservices (e.g., perform different functions). Different instances of microservice A in different containers correspond to the same microservice (e.g., perform the same function). Different instances of microservice B in different containers correspond to the same microservice (e.g., perform the same function). The current or real-time microservice operation data and host component resource utilization data is used by the orchestration engine 240 to determine whether there is a need for scaling (e.g., adding a new microservice hosting instance on and/or removing a current microservice hosting instance from one or more of the host devices 203). As noted herein above, rules may be implemented to trigger addition or removal of a hosting instance based on a resource utilization state and/or in response to failure of an existing hosting instance.

The orchestration engine 240 is the same as or similar to the orchestration engine 140. In illustrative embodiments, the orchestration engine 240 is hosted in container 250 (e.g., Docker, LXC or other type of container) and acts as a router for invocation of microservices to the appropriate containers 255. The operational flow 200 further depicts a user device 202, which may be the same as or similar to one of the user devices 102. In illustrative embodiments, in response to a determination of a need for a new hosting instance for a microservice, the resource prediction engine 230 receives a request from the orchestration engine 240 to predict an amount of one or more resources for the new hosting instance. Using one or more machine learning models, the resource prediction engine 230 predicts the amount of the one or more resources for the new hosting instance in response to the request. In an illustrative embodiment, the predicted resource amounts (e.g., CPU millicores and storage and memory sizes) are provided to the orchestration engine 240, which generates the new hosting instance incorporating the predicted resource amounts. For example, as shown in FIG. 2, in a scenario where new containers for microservices A and B are needed, the orchestration engine 240 predicts resource sizes for containers hosting microservices A and B and, as shown by the check marks, generates new containers 5 and 6 255-5 and 255-6 with predicted resource sizes for instances of microservices A and B 256-5 and 256-6, respectively. In addition, in the embodiment of FIG. 2, as shown by the "X" marks, the orchestration engine 240 deactivates containers 3 and 4 255-3 and 255-4 corresponding to instances of microservices A and B 256-3 and 256-4, respectively. In more detail, a hosting instance generation layer in orchestration engine 240 (similar to hosting instance generation layer 141) generates new containers 5 and 6 255-5 and 255-6 based on the predicted resource sizes. A hosting instance provisioning layer in orchestration engine 240 (similar to hosting instance provisioning layer 142)

deactivates containers 3 and 4 255-3 and 255-4, and provisions instances of microservices A and B 256-5 and 256-6 to containers 5 and 6 255-5 and 255-6. In one or more embodiments, the host devices 203 (or 103) and the containers 255 may be part of a cluster of host devices 203 (or 103) and/or containers 255.

Figure 3:
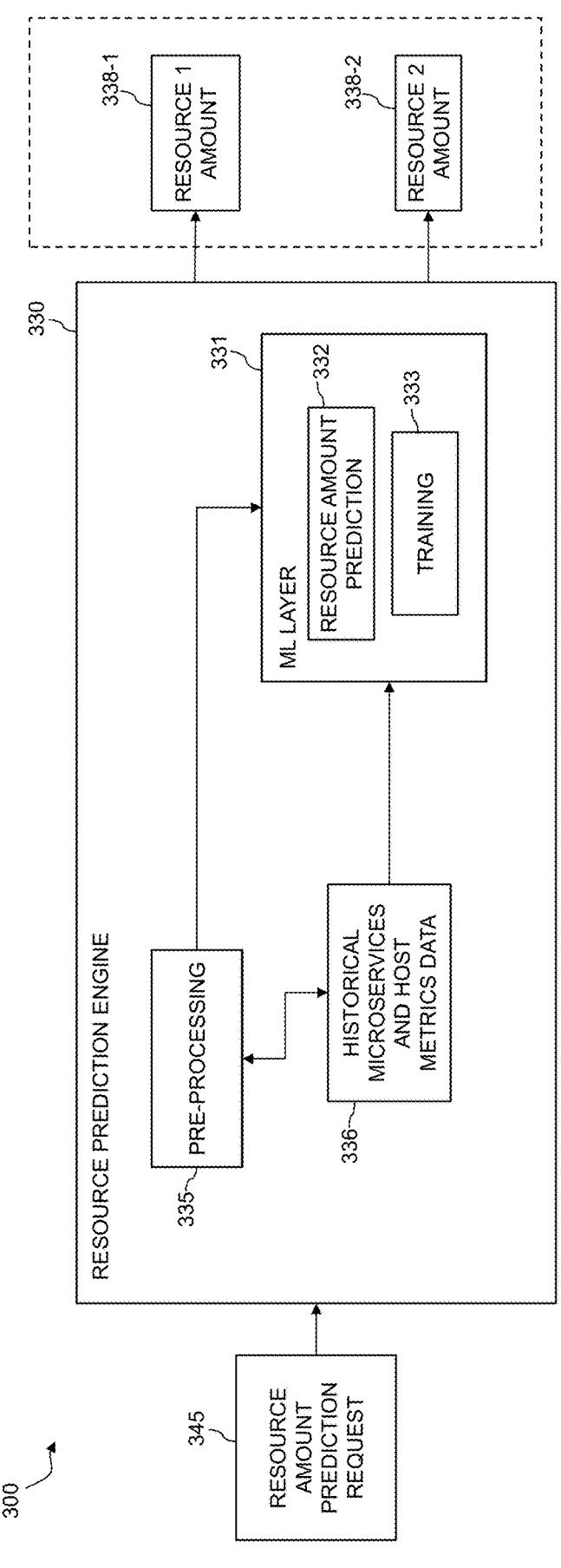
FIG. 3 depicts an operational flow for microservice resource amount prediction in an illustrative embodiment.

Referring to the operational flow 300 in FIG. 3, a more detailed explanation of an embodiment of a resource prediction engine 330 is described. The resource prediction engine 330 may be the same as or similar to the resource prediction engine 130 or 230. A resource amount prediction request 345 for a hosting instance of a microservice is received from, for example, an orchestration engine (e.g., orchestration engine 140 or 240) and input to the resource prediction engine 330. The resource prediction engine 330 illustrates a pre-processing component 335, which processes the incoming request and the historical microservices and host metrics data 336 for analysis by the machine learning (ML) layer 331. For example, the pre-processing component 335 removes any unwanted characters, punctuation, and stop words. As can be seen in FIG. 3, the resource prediction engine 330 predicts resource amounts for a new hosting instance of a microservice using the ML layer 331 comprising resource amount prediction and training layers 332 and 333. The ML layer 331 is the same as or similar to machine learning layer 131. The resource amount prediction layer 332 determines, based on the historical microservice operation and host metrics data 336 collected by a monitoring, collection and logging layer (e.g., monitoring, collection and logging layer 121 or 221), resource 1 and resource 2 amounts 338-1 and 338-2. According to one or more embodiments, the resource 1 and resource 2 amounts 338-1 and 338-2 correspond to CPU millicores and storage or memory (e.g., RAM) sizes.

In connection with the operation of the resource prediction engine 330 (or 130/230), FIG. depicts example pseudocode 500 for importation of libraries used to implement the resource prediction engine 330. For example, Python, ScikitLearn, Pandas and Numpy libraries can be used. Some embodiments may implement multi-output regression using a neural network with Tensorflow® and/or Keras libraries. A shallow learning approach with a gradient boosting algorithm may also be used.

Figures 6A, 6B:
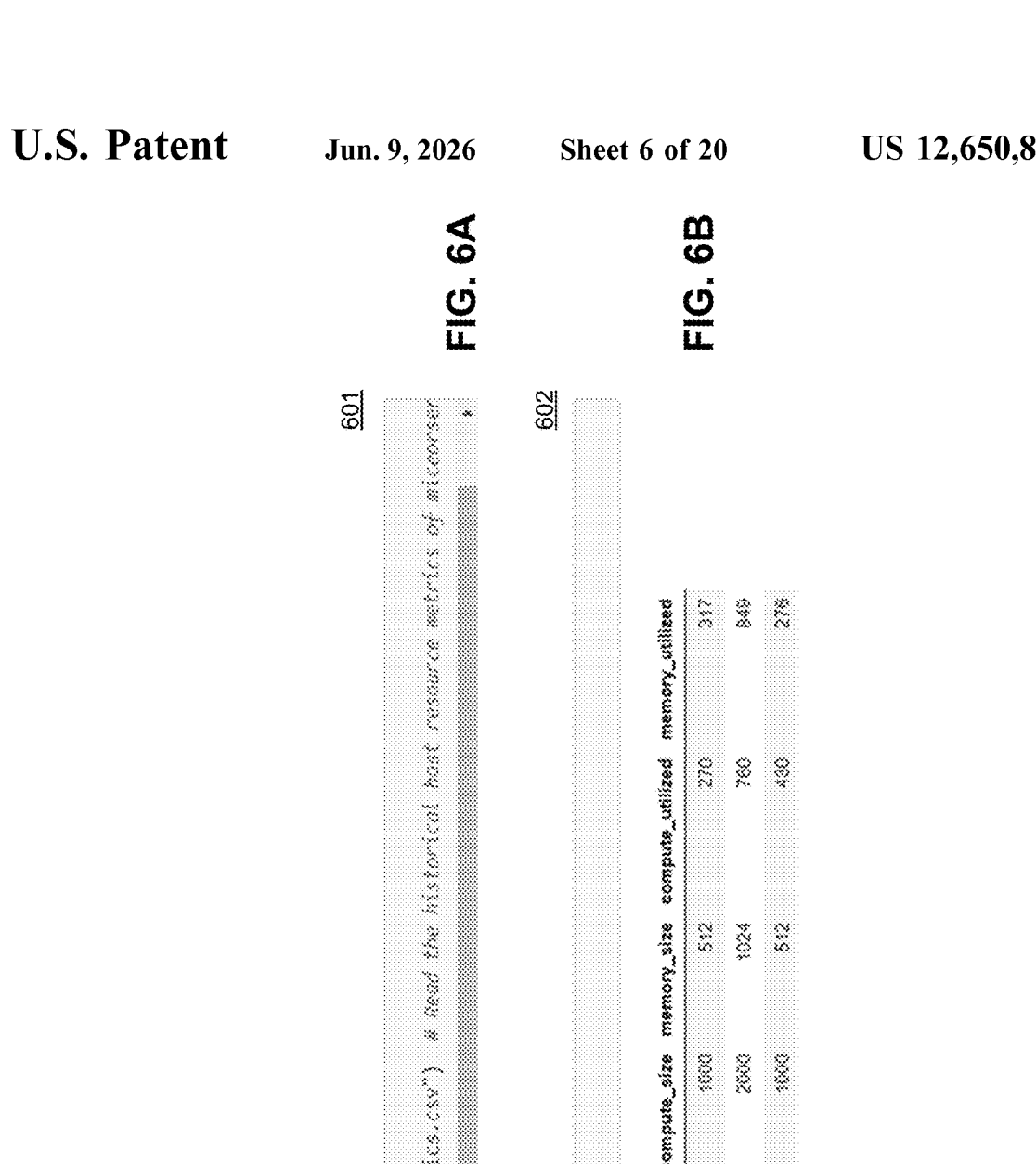
FIG. 6A depicts example pseudocode for loading historical microservices and hosting container metrics into a data frame in an illustrative embodiment.
FIG. 6B depicts example training data in an illustrative embodiment.

FIG. 6A depicts example pseudocode 601 for loading historical microservices and hosting container metrics into a Pandas data frame for building training data. Similar to FIG. 4, FIG. 6B depicts a table 602 of example training data in an illustrative embodiment. As can be seen in the table 602, the training data identifies a date and time of the microservice operation, the microservice name, an instance ID number, instance type, compute size (e.g., number of CPU cores (millicores)), memory size of host components (e.g., host devices, containers, pods, VMs, etc.), CPU utilization, and memory (e.g., RAM) utilization. The data shown in the table 602 is a non-limiting example of the attributes of training data, and the embodiments are not necessarily limited to the depicted attributes.

FIG. 7A depicts example pseudocode 701 for performing feature engineering on training data, and FIG. 7B depicts a table 702 of feature engineered training data. The date and/or time of a transaction (e.g., microservice operation, request for microservice operation, etc.) can play an important role in resource amount prediction, as the date and/or time captures seasonality and traffic patterns, volume and load on the microservice, as well as the hosting infrastructure during certain periods (e.g., increased seasonal load due to, for example, holidays and other factors). The pseudocode

701 implements feature engineering to extract and isolate, for example, year, month, week, day, name of the day, hour, minute from dates as shown in the table 702.

FIG. 8A depicts example pseudocode 801 for concatenating an original data frame and a data extracted data frame, and FIG. 8B depicts the combined data frame 802. An original data frame and the date extracted data frame (table 702) are concatenated to create the combined data frame 802 referred to as "host_resources_df" with columns for year, month, week, day, name of the day, hour, minute, microservice name, instance ID number, instance type, compute size, memory size and CPU utilization.

Referring back to the pre-processing component 335 in FIG. 3, since machine learning works with numbers, categorical and textual attributes like the day name, microservice name, etc. must be encoded before being used as training data. In one or more embodiments, this can be achieved by leveraging a LabelEncoder function of ScikitLearn library as shown in the pseudocode 901 in FIG. 9A. FIG. 9B depicts a table 902 of the encoded training data, where categorical and textual attributes are converted into numerical values.

According to illustrative embodiments, the encoded training dataset is split into training and testing datasets, separate datasets are created for independent variables and dependent variables. For example, some embodiments use two dependent variables (e.g., compute (CPU) utilization and memory utilization). FIG. 10 depicts example pseudocode 1000 for splitting a dataset into training and testing components and for creating separate datasets for independent (X) and dependent (y) variables.

Once the datasets are ready for training and testing, various machine learning models are built using different algorithms. For example, FIG. 11 depicts example pseudocode 1100 for building, training and computing accuracy of a linear regression model. The linear regression algorithm natively supports multi-target regression. The accuracy of the linear regression model is depicted as about 81%. In another example, FIG. 12 depicts example pseudocode 1200 for building, training and computing accuracy of a KNN regression model, which also natively supports multi-target regression. The accuracy of the KNN regression model is depicted as about 90%.

FIG. 13 depicts example pseudocode 1300 for building, training and computing accuracy of a gradient booting regression model. The gradient booting regression model is an ensemble, decision tree boosting algorithm that does not support multi-output regression natively. However, as noted herein above, in accordance with illustrative embodiments, a wrapper object is created (e.g., MultiOutputRegressor created from a ScikitLearn library) and is used in conjunction with the model to achieve multi-output support. The accuracy of the gradient booting regression model is depicted as about 95%.

A random forest regression model is an ensemble, decision tree bagging algorithm that natively supports multi-output regression. FIG. 14 depicts example pseudocode 1400 for building, training and computing accuracy of a random forest regression model. The accuracy of the random forest regression model is depicted as about 89%.

An SVM linear regression model does not support multi-output regression natively. Similar to the gradient boosting regression model, the SVM linear regression model, in accordance with illustrative embodiments, implements a wrapper object (e.g., MultiOutputRegressor), which is used in conjunction with the model to achieve multi-output support. FIG. 15 depicts example pseudocode 1500 for building, training and computing accuracy of an SVM linear regression model. The accuracy of the SVM linear regression model is depicted as about 89%. Although one or more regression models may perform well (e.g., relatively high accuracy), in some embodiments, hyperparameters are tuned and k-fold cross validations are performed with more data to further improve accuracy.

In some illustrative embodiments, a neural network is built to predict multiple target variables (e.g., compute utilization and memory utilization). For example, referring to FIG. 16, which depicts example pseudocode 1600 for building a neural network, a dense neural network is built using a Keras functional model. Two separate dense layers are added to the input layer with each network being capable of predicting a target (e.g., compute utilization or memory utilization).

Referring to FIG. 17, which depicts example pseudocode 1700 for compiling and training the generated neural network, an Adam optimization algorithm is used as an optimizer and mean squared error is used as a loss function for regression paths to each target. The model is trained with independent variable data (X_train) and the target variables are passed for each regression path. As shown by the pseudocode 1800 in FIG. 18, the neural network model predicts multiple target values (e.g., compute utilization and memory utilization) by passing independent variable values.

According to one or more embodiments, the historical microservices and host metrics repository 122/222 and other data repositories or databases referred to herein can be configured according to a relational database management system (RDBMS) (e.g., PostgreSQL). In some embodiments, the historical microservices and host metrics repository 122/222 and other data repositories or databases referred to herein are implemented using one or more storage systems or devices associated with the resource prediction platform 110. In some embodiments, one or more of the storage systems utilized to implement the historical microservices and host metrics repository 122/222 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the resource prediction platform 110, the data collection engine 120, resource prediction engine 130 and/or orchestration engine 140 in other embodiments can be implemented at least in part externally to the resource prediction platform 110, for example, as stand-alone servers, sets of servers or other types of systems coupled to the network 104. For example, the data collection engine 120, resource prediction engine 130 and/or orchestration engine 140 may be provided as cloud services accessible by the resource prediction platform 110.

The data collection engine 120, resource prediction engine 130 and/or orchestration engine 140 in the FIG. 1 embodiment are each assumed to be implemented using at least one processing device. Each such processing device generally comprises at least one processor and an associated memory, and implements one or more functional modules for controlling certain features of the data collection engine 120, resource prediction engine 130 and/or orchestration engine 140.

At least portions of the resource prediction platform 110 and the elements thereof may be implemented at least in part in the form of software that is stored in memory and executed by a processor. The resource prediction platform 110 and the elements thereof comprise further hardware and software required for running the resource prediction platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, resource prediction engine 130, orchestration engine 140 and other elements of the resource prediction platform 110 in the present embodiment are shown as part of the resource prediction platform 110, at least a portion of the data collection engine 120, resource prediction engine 130, orchestration engine 140 and other elements of the resource prediction platform 110 in other embodiments may be implemented on one or more other processing platforms that are accessible to the resource prediction platform 110 over one or more networks. Such elements can each be implemented at least in part within another system element or at least in part utilizing one or more stand-alone elements coupled to the network 104.

It is assumed that the resource prediction platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or LXCs, or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120, resource prediction engine 130, orchestration engine 140 and other elements of the resource prediction platform 110, and the elements thereof can each be implemented in the form of one or more LXCs running on one or more VMs. Other arrangements of one or more processing devices of a processing platform can be used to implement the data collection engine 120, resource prediction engine 130 and orchestration engine 140, as well as other elements of the resource prediction platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the resource prediction platform 110 to reside in different data centers. Numerous other distributed implementations of the resource prediction platform 110 are possible.

Accordingly, one or each of the data collection engine 120, resource prediction engine 130, orchestration engine 140 and other elements of the resource prediction platform 110 can each be implemented in a distributed manner so as to comprise a plurality of distributed elements implemented on respective ones of a plurality of compute nodes of the resource prediction platform 110.

It is to be appreciated that these and other features of illustrative embodiments are presented by way of example only, and should not be construed as limiting in any way. Accordingly, different numbers, types and arrangements of system elements such as the data collection engine 120, resource prediction engine 130, orchestration engine 140 and other elements of the resource prediction platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the resource prediction platform can be offered to cloud infrastructure customers or other users as part of FaaS, CaaS and/or PaaS offerings.

The operation of the information processing system 100 will now be described in further detail with reference to the flow diagram of FIG. 19. With reference to FIG. 19, a process 1900 for resource amount prediction as shown includes steps 1902 and 1904, and is suitable for use in the system 100 but is more generally applicable to other types of information processing systems comprising a resource prediction platform configured for microservice resource amount prediction and microservice assignment.

In step 1902, a request to predict an amount of at least one resource for at least one hosting instance of one or more microservices is received. In step 1904, using one or more machine learning models, the amount of the at least one resource is predicted in response to the request. The at least one hosting instance is generated based, at least in part, on the predicted amount. The one or more microservices are provisioned to the generated hosting instance based, at least in part, on the predicted amount.

In illustrative embodiments, the at least one resource comprises, for example, a memory and/or a CPU, and the amount of the at least one resource comprises a size of the memory and/or a number of CPU core units. The at least one hosting instance comprises at least one of a pod, a container and a VM, and is part of a cluster of hosting instances.

The one or more machine learning models are trained with a dataset comprising historical metrics of the at least one hosting instance corresponding to the one or more microservices. The historical metrics further correspond to respective dates, wherein feature engineering is performed to extract at least one of a year, a month, a week and a day from the respective dates. The historical metrics comprise historical resource utilization data by the one or more microservices. One or more independent variable datasets and one or more dependent variable datasets are created from the dataset, wherein the one or more dependent variable datasets correspond to at least one of CPU utilization and memory utilization. The one or more machine learning models comprise a multiple output regression machine learning algorithm, wherein outputs of the multiple output regression machine learning algorithm comprise a memory size and a number of CPU core units.

It is to be appreciated that the FIG. 19 process and other features and functionality described above can be adapted for use with other types of information systems configured to execute resource prediction services in a resource prediction platform or other type of platform.

The particular processing operations and other system functionality described in conjunction with the flow diagram of FIG. 19 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 19 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a resource prediction platform as disclosed herein can provide a number of significant advantages relative to conventional arrangements. For example, the resource prediction platform uses machine learning to predict resource sizes for new microservice hosting instances and uses the predicted values when provisioning new microservice instances. Technical problems exist with conventional scaling approaches that use a static configuration file-based approach, which universally applies user-configured resource sizes to various types of microservices. Existing microservice instance scaling approaches fail to consider the differences in resource utilization of different microservices when creating new microservice hosting instances. As a result, resources are not efficiently provisioned, resulting in inefficient utilization of the compute, storage and other resources.

Unlike conventional approaches, illustrative embodiments provide technical solutions which formulate programmatically and with a high degree of accuracy, the prediction of actual resource size (e.g., compute (CPU) utilization (e.g., millicores, percentages), storage utilization (e.g., KiB, MiB, percentages) and/or memory utilization (e.g., KiB, MiB, percentages)) of a hosting instance (e.g., container, pod, VM) for a given microservice based on historical parameters. The embodiments advantageously leverage one or more sophisticated machine learning algorithms and train the machine learning algorithm(s) using historical utilization data and host infrastructure metrics corresponding to the same or similar microservices as those for which new hosting instances need to be created.

As an additional advantage, illustrative embodiments implement a multi-target regression model that is trained using multi-dimensional features of historical resource utilization data by microservices. The model predicts the sizes of resources for new hosting instances, wherein the prediction factors in seasonality, load, and volume of previous microservices transactions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the resource prediction platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a resource prediction platform in illustrative embodiments. These and other cloud-based systems in illustrative embodiments can include object stores.

Illustrative embodiments of processing platforms will now be described in greater detail with reference to FIGS. 20 and 21. Although described in the context of system 100, these platforms may also be used to implement at least portions of other information processing systems in other embodiments.

Figure 20:
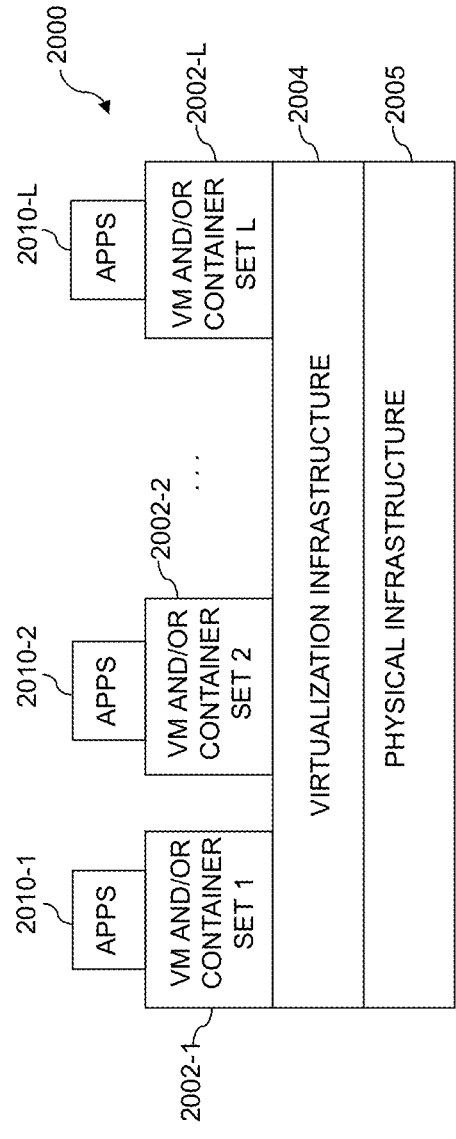
FIGS. 20 and 21 show examples of processing platforms that may be utilized to implement at least a portion of an information processing system according to illustrative embodiments.
Figure 21:
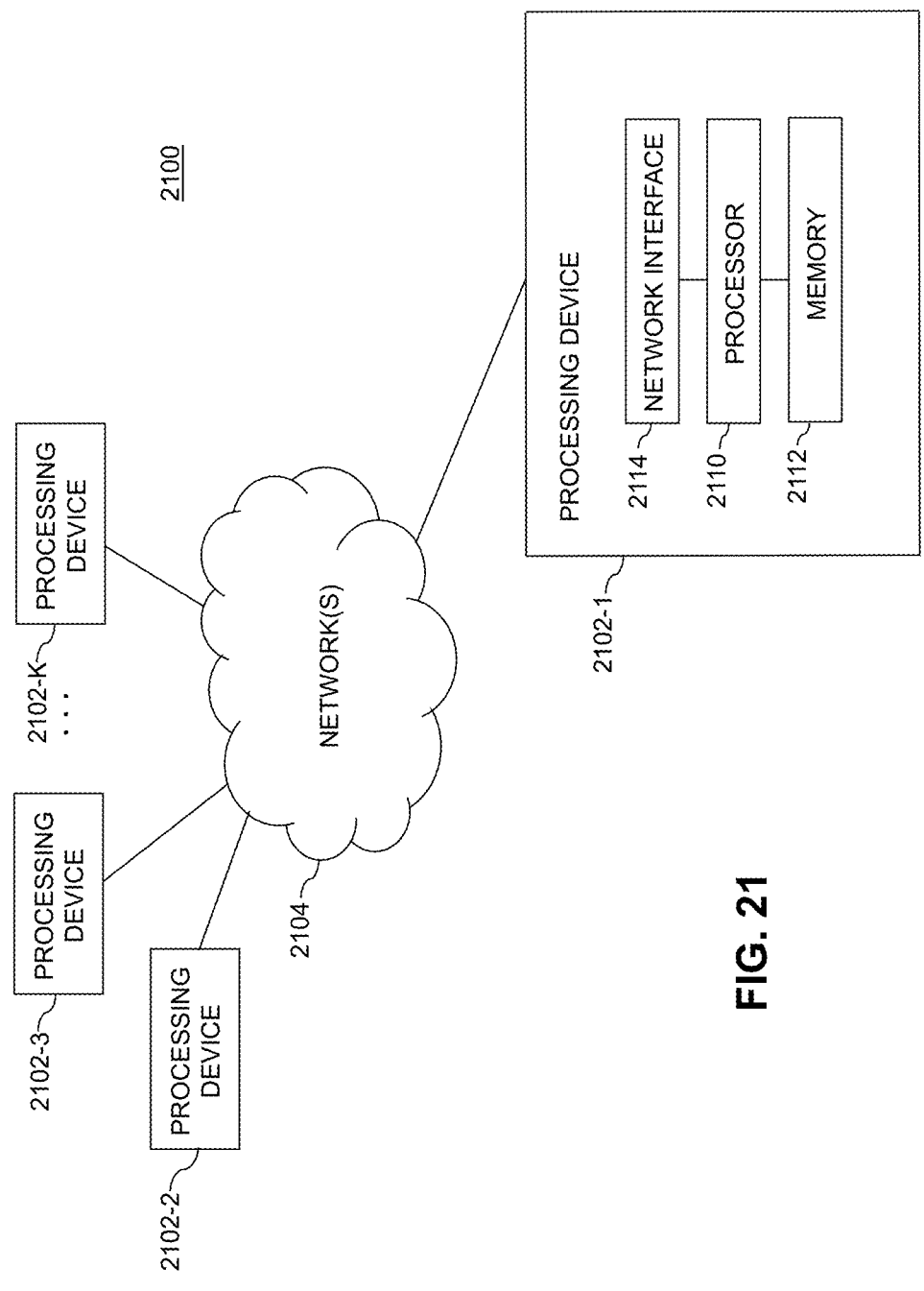

FIG. 20 shows an example processing platform comprising cloud infrastructure 2000. The cloud infrastructure 2000 comprises a combination of physical and virtual processing resources that may be utilized to implement at least a portion of the information processing system 100. The cloud infrastructure 2000 comprises multiple virtual machines (VMs) and/or container sets 2002-1, 2002-2, . . . 2002-L implemented using virtualization infrastructure 2004. The virtualization infrastructure 2004 runs on physical infrastructure 2005, and illustratively comprises one or more hypervisors and/or operating system level virtualization infrastructure. The operating system level virtualization infrastructure illustratively comprises kernel control groups of a Linux operating system or other type of operating system.

The cloud infrastructure 2000 further comprises sets of applications 2010-1, 2010-2, . . . 2010-L running on respective ones of the VMs/container sets 2002-1, 2002-2, . . . 2002-L under the control of the virtualization infrastructure 2004. The VMs/container sets 2002 may comprise respective VMs, respective sets of one or more containers, or respective sets of one or more containers running in VMs.

In some implementations of the FIG. 20 embodiment, the VMs/container sets 2002 comprise respective VMs implemented using virtualization infrastructure 2004 that comprises at least one hypervisor. A hypervisor platform may be used to implement a hypervisor within the virtualization infrastructure 2004, where the hypervisor platform has an associated virtual infrastructure management system. The underlying physical machines may comprise one or more distributed processing platforms that include one or more storage systems.

In other implementations of the FIG. 20 embodiment, the VMs/container sets 2002 comprise respective containers implemented using virtualization infrastructure 2004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 2000 shown in FIG. 20 may represent at least a portion of one processing platform. Another example of such a processing platform is processing platform 2100 shown in FIG. 21.

The processing platform 2100 in this embodiment comprises a portion of system 100 and includes a plurality of processing devices, denoted 2102-1, 2102-2, 2102-3, . . . 2102-K, which communicate with one another over a network 2104.

The network 2104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 2102-1 in the processing platform 2100 comprises a processor 2110 coupled to a memory 2112. The processor 2110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 2112 may comprise random access memory (RAM), read-only memory (ROM), flash memory or other types of memory, in any combination. The memory 2112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 2102-1 is network interface circuitry 2114, which is used to interface the processing device with the network 2104 and other system components, and may comprise conventional transceivers.

The other processing devices 2102 of the processing platform 2100 are assumed to be configured in a manner similar to that shown for processing device 2102-1 in the figure.

Again, the particular processing platform 2100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the resource prediction platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and resource prediction platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving, in a provisioning platform coupled to a plurality of host devices over at least one network, each of the host devices implementing one or more hosting instances for microservices, a request to predict an amount of at least one resource for at least one hosting instance of one or more microservices;

predicting, using one or more machine learning models of a processor-based machine learning system of the provisioning platform, the amount of the at least one resource in response to the request, the one or more machine learning models comprising a trained machine learning model that jointly predicts at least a first host resource utilization for a first resource type of the one or more microservices and a second host resource utilization for a second resource type of the one or more microservices, the second resource type being different than the first resource type, wherein the one or more machine learning models comprise a multiple output regression machine learning algorithm, in which a first one of the outputs of the multiple output regression machine learning algorithm corresponds to the first resource type and a second one of the outputs of the multiple output regression machine learning algorithm corresponds to the second resource type;

configuring, at least in part responsive to the predicting, the at least one hosting instance on a particular one of the host devices to provide a first configuration for the first resource type and a second configuration for the second resource type, wherein the configuring is performed by an orchestration engine of the provisioning platform, the orchestration engine having access to a configuration file specifying upper and lower resource limits for each of at least one of the first and second resource types, and wherein the orchestration engine utilizes one or more results of the predicting in place of at least one of the upper and lower resource limits specified in the configuration file; and running the one or more microservices in the configured at least one hosting instance on the particular host device;

wherein the at least one hosting instance is generated based, at least in part, on the predicted amount; and wherein the steps of the method are executed by at least one processing device operatively coupled to at least one memory.

2. The method of claim 1 wherein the at least one resource comprises a memory and the amount of the at least one resource comprises a size of the memory.

3. The method of claim 1 wherein the at least one resource comprises a central processing unit (CPU) and the amount of the at least one resource comprises a number of CPU core units.

4. The method of claim 1 wherein the at least one hosting instance comprises at least one of a pod, a container and a virtual machine.

5. The method of claim 4 wherein the at least one hosting instance is part of a cluster of hosting instances.

6. The method of claim 1 further comprising training the one or more machine learning models with a dataset comprising historical metrics of the at least one hosting instance corresponding to the one or more microservices.

7. The method of claim 6 wherein the historical metrics further correspond to respective dates.

8. The method of claim 7 further comprising extracting at least one of a year, a month, a week and a day from the respective dates.

9. The method of claim 6 wherein the historical metrics comprise historical resource utilization data by the one or more microservices.

10. The method of claim 6 further comprising creating from the dataset one or more independent variable datasets and one or more dependent variable datasets.

11. The method of claim 10 wherein the one or more dependent variable datasets correspond to at least one of central processing unit (CPU) utilization and memory utilization.

12. The method of claim 1 wherein outputs of the multiple output regression machine learning algorithm comprise a memory size and a number of central processing unit (CPU) core units.

13. The method of claim 1 wherein the one or more microservices are provisioned to the at least one hosting instance that is generated based, at least in part, on the predicted amount.

14. An apparatus comprising:

a processing device operatively coupled to a memory and configured:

to receive, in a provisioning platform coupled to a plurality of host devices over at least one network, each of the host devices implementing one or more hosting instances for microservices, a request to predict an amount of at least one resource for at least one hosting instance of one or more microservices;

to predict, using one or more machine learning models of a processor-based machine learning system of the provisioning platform, the amount of the at least one resource in response to the request, the one or more machine learning models comprising a trained machine learning model that jointly predicts at least a first host resource utilization for a first resource type of the one or more microservices and a second host resource utilization for a second resource type of the one or more microservices, the second resource type being different than the first resource type, wherein the one or more machine learning models comprise a multiple output regression machine learning algorithm, in which a first one of the outputs of the multiple output regression machine learning algorithm corresponds to the first resource type and a second one of the outputs of the multiple output regression machine learning algorithm corresponds to the second resource type;

to configure, at least in part responsive to the predicting, the at least one hosting instance on a particular one of the host devices to provide a first configuration for the first resource type and a second configuration for the second resource type, wherein the configuring is performed by an orchestration engine of the provisioning platform, the orchestration engine having access to a configuration file specifying upper and lower resource limits for each of at least one of the first and second resource types, and wherein the orchestration engine utilizes one or more results of the predicting in place of at least one of the upper and lower resource limits specified in the configuration file; and to run the one or more microservices in the configured at least one hosting instance on the particular host device;

wherein the at least one hosting instance is generated based, at least in part, on the predicted amount.

15. The apparatus of claim 14 wherein the processing device is further configured to train the one or more machine learning models with a dataset comprising historical metrics of the at least one hosting instance corresponding to the one or more microservices.

16. The apparatus of claim 15 wherein the historical metrics comprise historical resource utilization data by the one or more microservices.

17. An article of manufacture comprising a non-transitory processor-readable storage medium having stored therein program code of one or more software programs, wherein the program code when executed by at least one processing device causes the at least one processing device to perform the steps of:

receiving, in a provisioning platform coupled to a plurality of host devices over at least one network, each of the host devices implementing one or more hosting instances for microservices, a request to predict an amount of at least one resource for at least one hosting instance of one or more microservices;

predicting, using one or more machine learning models of a processor-based machine learning system of the provisioning platform, the amount of the at least one resource in response to the request, the one or more machine learning models comprising a trained machine learning model that jointly predicts at least a first host resource utilization for a first resource type of the one or more microservices and a second host resource utilization for a second resource type of the one or more microservices, the second resource type being different than the first resource type, wherein the one or more machine learning models comprise a multiple output regression machine learning algorithm, in which a first one of the outputs of the multiple output regression machine learning algorithm corresponds to the first resource type and a second one of the outputs of the multiple output regression machine learning algorithm corresponds to the second resource type;

configuring, at least in part responsive to the predicting, the at least one hosting instance on a particular one of the host devices to provide a first configuration for the first resource type and a second configuration for the second resource type, wherein the configuring is performed by an orchestration engine of the provisioning platform, the orchestration engine having access to a configuration file specifying upper and lower resource limits for each of at least one of the first and second resource types, and wherein the orchestration engine utilizes one or more results of the predicting in place of at least one of the upper and lower resource limits specified in the configuration file; and running the one or more microservices in the configured at least one hosting instance on the particular host device;

wherein the at least one hosting instance is generated based, at least in part, on the predicted amount.

18. The article of manufacture of claim 17 wherein the program code further causes the at least one processing device to perform the step of training the one or more machine learning models with a dataset comprising historical metrics of the at least one hosting instance corresponding to the one or more microservices.

19. The article of manufacture of claim 18 wherein the historical metrics comprise historical resource utilization data by the one or more microservices.

20. The article of manufacture of claim 17 wherein the one or more microservices are provisioned to the at least one hosting instance that is generated based, at least in part, on the predicted amount.

\* \* \* \* \*